J. S. WHITAKER.
APPARATUS FOR REMOVING ROOTS AND THE LIKE FROM PEAT.
APPLICATION FILED AUG. 21, 1913.

1,153,661.

Patented Sept. 14, 1915.
4 SHEETS—SHEET 1.

WITNESSES

INVENTOR
James Sidney Whitaker
BY
ATTORNEY

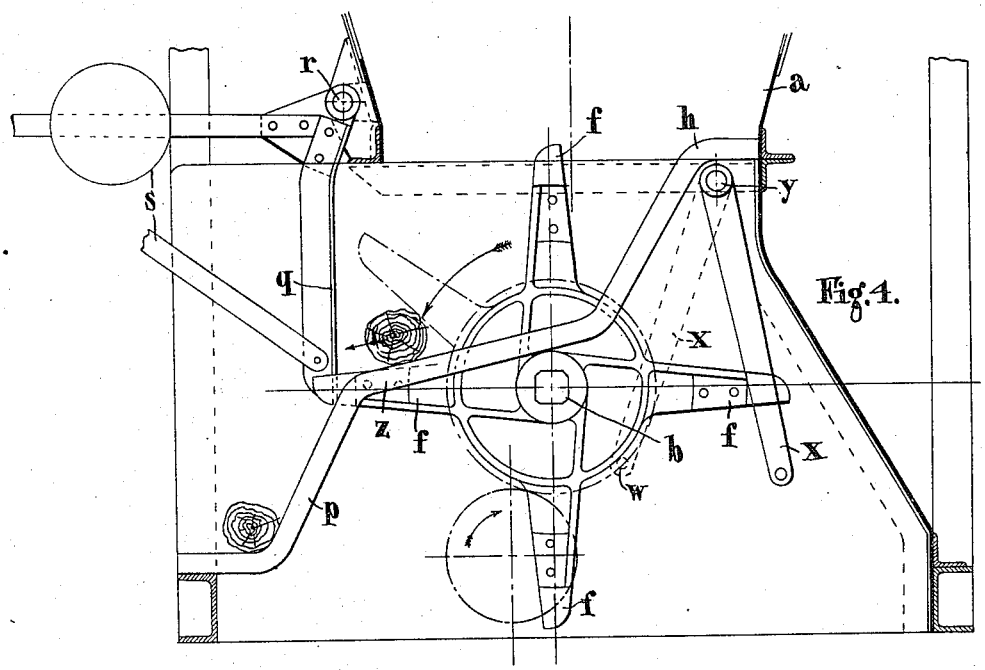

UNITED STATES PATENT OFFICE.

JAMES SIDNEY WHITAKER, OF DUMFRIES, SCOTLAND, ASSIGNOR TO WETCARBONIZING LIMITED, OF LONDON, ENGLAND.

APPARATUS FOR REMOVING ROOTS AND THE LIKE FROM PEAT.

1,153,661.     Specification of Letters Patent.     Patented Sept. 14, 1915.

Application filed August 21, 1913. Serial No. 785,961.

*To all whom it may concern:*

Be it known that I, JAMES SIDNEY WHITAKER, of 61 Loreburn street, Dumfries, Scotland, a subject of the King of Great Britain and Ireland, have invented certain new and useful Improvements in Apparatus for Removing Roots and the like from Peat, of which the following is a specification.

The object of this invention is to provide an apparatus by which roots and other large objects are automatically removed from peat, without being accompanied by an unduly large quantity of the latter.

The apparatus into which the excavated peat is fed is, according to this invention, provided with an element which feeds the peat through the apparatus, and with another element against which the roots or other large objects come into contact in passing through the apparatus. When this occurs, one of the elements acts as an abutment, against and over which the other element, by continuing its movement, pushes the object until separated from the peat mass, and ejected from the apparatus.

The accompanying drawings show two forms of apparatus according to this invention.

Figure 1:
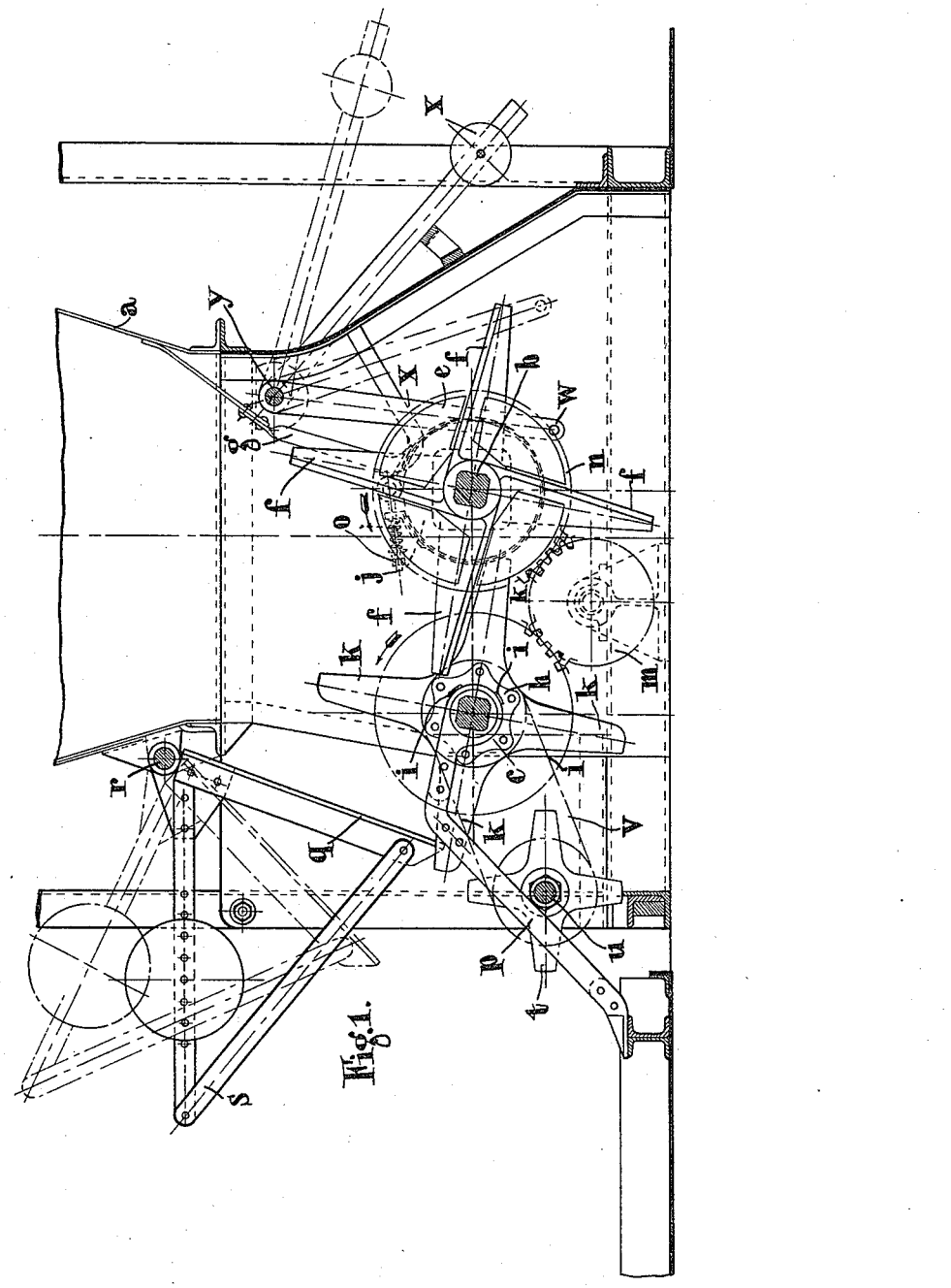
Figure 2:
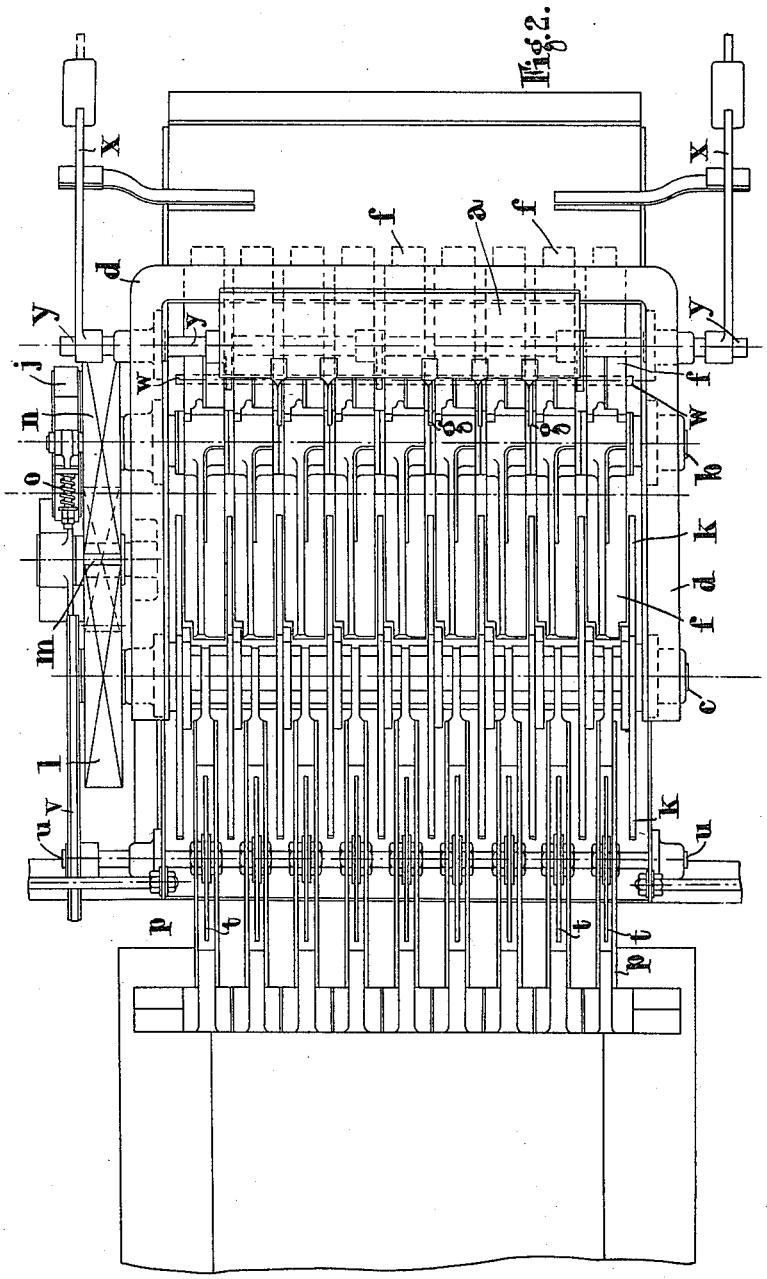
Figure 3:
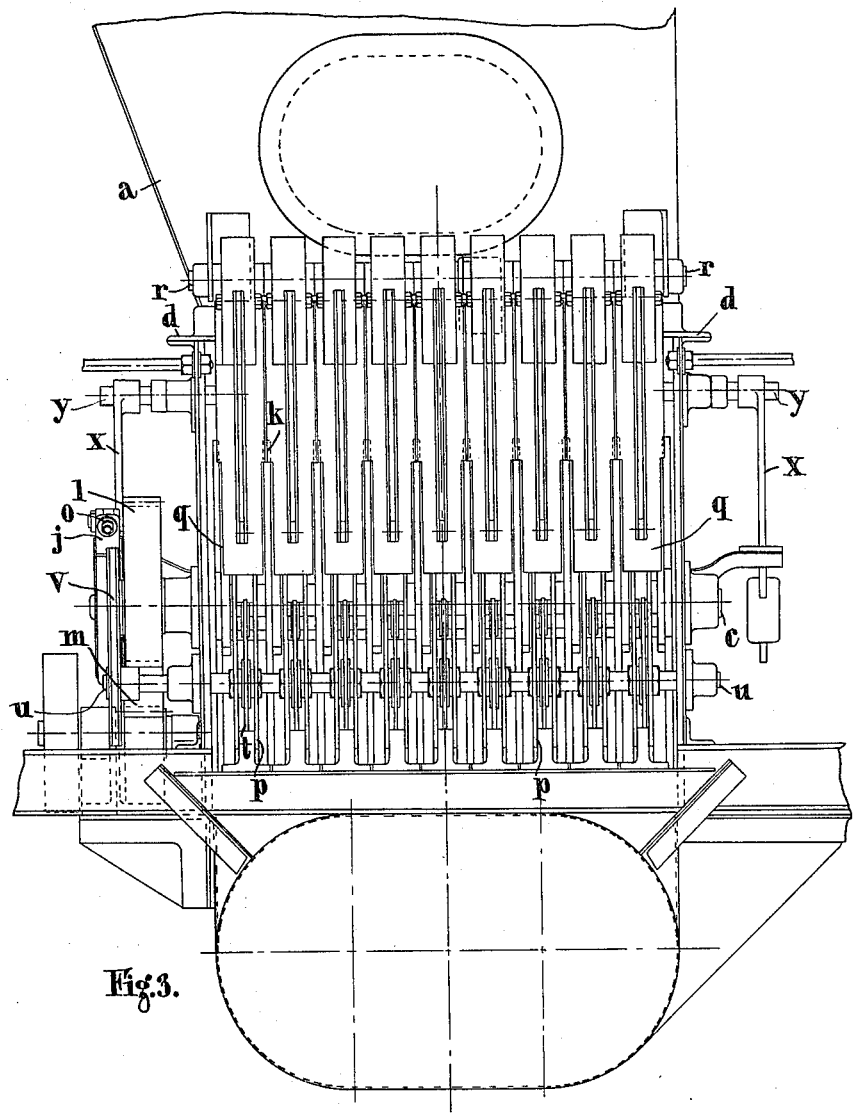

Figure 1 shows one form in sectional elevation; Fig. 2 a plan of the same, with part of the upper structure removed; while Fig. 3 is an elevation, as seen from the left hand side of Fig. 1. Fig. 4 is a sectional elevation of a second form of the apparatus.

The root or like separating apparatus, illustrated in Figs. 1 to 3, comprises a hopper $a$, beneath which are arranged a series of rotatable bladed elements, which are secured upon parallel shafts $b$ and $c$, supported on a suitable framework $d$ below the hopper outlet. Each bladed element on the shaft $b$ comprises a boss $e$ of fairly large diameter, and four outwardly extending blades $f$ of T section; while interposed between each of the bladed elements on the shaft $b$ are guides $g$, attached to the hopper $a$. On the other shaft $c$, the bladed elements comprise a serrated boss $h$, having projections $i$, and four outwardly extending blades $k$, which are narrower than the blades $f$, and can pass between the latter.

The shafts $b$ and $c$ are rotated in a counter-clockwise direction, as indicated by the arrows, the power for this purpose being transmitted to the shaft $c$, and from the latter to the shaft $b$, by means of a toothed wheel $l$ rigidly connected to the shaft $c$, and engaging with an intermediate pinion $m$, which gears with a toothed wheel $n$, connected to the shaft $b$ by a friction clutch $j$, the slipping pressure of which can be varied by adjusting the tension of a spring $o$. On the side of the shaft $c$ remote from the feeding blades $f$, guide bars $p$ are arranged between the bladed elements, while separate doors $q$ for each of said elements are pivoted at $r$ to the hopper $a$, and maintained in contact with the guide bars $p$ by weighted levers $s$. Situated between the guide bars $p$ on the outside of the doors $q$, are star wheels $t$, mounted upon a shaft $u$, which is driven by a chain $v$ from the shaft $c$, for the purpose of carrying separated roots or the like from the neighborhood of the doors $q$. Suitable scraping devices, such as a rod $w$, maintained in contact with the boss $e$, and the blades $f$, by means of a weighted lever $x$, movable about a shaft $y$, are also provided to prevent material adhering to the blades $f$.

When the device is in operation, the peat is fed into the hopper $a$, from which it passes between the feeding blades $f$ and the blades $k$, the latter of which, in rotating in a counter-clockwise direction, pass through and shear the peat. On an obstruction such as a root being encountered, the latter becomes jammed between the feeding and the shearing blades $f$ and $k$ respectively, whereupon, on the pressure at which the friction clutch $j$ has been adjusted to slip being exceeded, the feeding blades $f$ cease to rotate, and thereby permit the shearing blades $k$ in their continued movement to push the obstruction along the surface of the feeding blades $f$, the obstruction being thus automatically carried upward, and thrown against the doors $q$, which open and allow the obstruction to pass down the bars $p$, and be carried away from the neighborhood of the doors $q$ by the star wheels $t$, after which the normal operation of the apparatus is resumed.

In the event of the peat containing a long object, such as a stick, which is thin enough to pass between the blades $k$, if by any chance it assumed a position parallel to a plane in which these blades move, the longitudinal rib presented upward by the T-sectioned blades $f$ during movement of the latter downward between the blades $k$ will almost without exception deflect the object from such a position, and so prevent it passing through the machine.

According to the modified form of the device illustrated in Fig. 4, a plurality of elements having blades $f$ are mounted upon the shaft $b$ below the outlet of the hopper $a$. Guide bars $h$ attached to the latter extend between the bladed elements, and are continued beyond the weighted doors $q$ as guide bars $p$, having the same function as those in the previously described form. The guide bars $p$, however, are connected by an intermediate part $z$, which is inclined at such an angle to the coöperating blades $f$ that the shearing strength of the root or other object is always greater than the normal pressure exerted on the bars $z$, multiplied by the coefficient of friction between the object and the material of the bars. When this form of the apparatus is in operation, the peat discharged from the hopper $a$ is fed downward by the blades $f$ of the rotating elements, but on a root, for example, being encountered, the root is caught between the blades $f$ and the bars $z$, and instead of being sheared, is caused to slide along the bars $z$, until it contacts with the doors $q$, whereupon it is automatically ejected from the apparatus, and falls down the bars $p$ into the receptacle for separated roots. In this form of the device, the use of a friction clutch for driving the shaft $b$, which carries the feeding elements, is rendered unnecessary, although in some cases it may be found to be desirable.

In either form of the apparatus above described, it will be understood that instead of providing a number of doors through which the roots are ejected, a single door, having suitable slots to permit rotation of the adjacent bladed elements may be employed, such door or doors in all cases being arranged to open just sufficiently to permit ejection of the root or the like, but at the same time prevent escape of any of the peat.

I claim—

1. Apparatus for separating roots and other objects from peat, comprising in combination a moving element, an abutment along which the root or other object is pushed by the moving element until separated from the peat, and diverting means to prevent such objects passing through the apparatus by assuming a position substantially parallel to a plane in which said element moves.

2. Apparatus for separating roots and other objects from peat, comprising in combination coöperating comb-like elements capable of relative movement, and diverting means to prevent such objects passing through the apparatus by assuming a position substantially parallel to planes in which said elements move.

3. Apparatus for separating roots and other objects from peat, comprising in combination a rotating element, a plurality of blades mounted thereon, a plurality of members coöperating in shearing relationship with said blades and diverting means to prevent an object passing through the apparatus by assuming a position substantially parallel to a plane in which said blades move.

4. Apparatus for separating roots and other objects from peat, comprising in combination a plurality of moving blades, a plurality of stationary elements in shearing relationship with said moving elements, and diverting means to prevent an object passing between the stationary elements by assuming a position substantially parallel to a plane in which said blades move.

5. Apparatus for separating roots and other objects from peat, comprising in combination a plurality of moving elements, a plurality of stationary elements in shearing relationship with said moving elements, and diverting means on the moving elements to prevent objects which have one dimension greater than but another dimension less than the distance between adjacent stationary elements passing between such elements by assuming a position substantially parallel to a plane in which the moving elements move.

6. Apparatus for separating roots and other objects from peat, comprising in combination a rotating element, a plurality of blades thereon, a plurality of stationary elements between which the moving blades pass, and a longitudinal rib on the side of each moving blade which is uppermost when the blades are passing between the stationary elements.

7. Apparatus for separating roots and other objects from peat, comprising in combination a rotated element, a plurality of blades thereon, a plurality of members coacting in shearing relationship with said blades and scraping means contacting with moving parts to remove any peat adhering thereto.

8. Apparatus for separating roots and other objects from peat, comprising in combination a rotating element, a plurality of blades thereon, a plurality of stationary elements in shearing relationship with said blades and scraping means contacting consecutively with said blades to remove any peat adhering thereto.

9. Apparatus for separating roots and other objects from peat, comprising in combination a rotating element, a plurality of blades mounted thereon, a plurality of members co-acting in shearing relationship with said blades, and a plurality of doors for the exit of objects separated by the rotating element.

10. Apparatus for separating roots and other objects from peat, comprising in combination a rotating element, a plurality of blades mounted thereon, a plurality of stationary elements between which said blades pass, and with which they coöperate in shearing relationship, a longitudinal rib on the back of each blade to prevent passage between stationary elements of long objects substantially parallel to a plane in which said blades and elements move, scraping means contacting with the blades to remove peat therefrom, and a plurality of doors for the exit of the separated objects.

11. Apparatus for separating roots and other objects from peat, comprising in combination, a rotating element, a plurality of blades thereon, a plurality of members coöperating in shearing relationship with said blades, and a longitudinal rib on the side of each blade which is uppermost when the blades are passing between the coöperating members.

12. Apparatus for separating roots and other objects from peat, comprising in combination, a rotating element, a plurality of blades thereon, a plurality of members cooperating in shearing relationship with said blades, a longitudinal rib on the side of each blade which is uppermost when the blades are passing between the coöperating members, and a plurality of doors for the exit of objects separated by the rotating element.

13. Apparatus for separating roots and other objects from peat, comprising in combination, a rotating element, a plurality of blades thereon, a plurality of members, coöperating in shearing relationship with said blades, a longitudinal rib on the side of each blade which is uppermost when the blades are passing between the coöperating members, a plurality of doors for the exit of objects separated by the rotating element, and scraping means contacting with moving parts to remove peat therefrom.

In testimony whereof I have signed my name to this specification in the presence of two subscribing witnesses.

JAMES SIDNEY WHITAKER.

Witnesses:
 JOHN HOPE JOHNSTON,
 ANDREW B. SKILLING.

Copies of this patent may be obtained for five cents each, by addressing the "Commissioner of Patents, Washington, D. C."